I
US011310858B2

(12) United States Patent
Ahn et al.

(10) Patent No.: US 11,310,858 B2
(45) Date of Patent: Apr. 19, 2022

(54) METHOD AND APPARATUS FOR MANAGING RADIO LINK IN UNLICENSED BAND (71) Applicant: LG Electronics Inc., Seoul (KR)

(72) Inventors: Joonkui Ahn, Seoul (KR); Sukhyon Yoon, Seoul (KR); Hanjun Park, Seoul (KR); Changhwan Park, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 28 days.

(21) Appl. No.: 16/639,524

(22) PCT Filed: Aug. 14, 2018

(86) PCT No.: PCT/KR2018/009321
§ 371 (c)(1),
(2) Date: Feb. 14, 2020

(87) PCT Pub. No.: WO2019/035631
PCT Pub. Date: Feb. 21, 2019

(65) Prior Publication Data
US 2020/0236729 A1 Jul. 23, 2020

Related U.S. Application Data (60) Provisional application No. 62/628,286, filed on Feb. 9, 2018, provisional application No. 62/626,599, filed on Feb. 5, 2018, provisional application No. 62/564,274, filed on Sep. 28, 2017, provisional application No. 62/546,026, filed on Aug. 16, 2017.

(51) Int. Cl.
*H04W 76/18* (2018.01)
*H04L 5/00* (2006.01)

(52) U.S. Cl.
CPC .......... *H04W 76/18* (2018.02); *H04L 5/0048* (2013.01)

(58) Field of Classification Search
CPC ..... H04W 76/00; H04W 76/10; H04W 76/18; H04W 76/19; H04L 5/0048–0053
See application file for complete search history.

(56) References Cited

U.S. PATENT DOCUMENTS

| | | | |
|---|---|---|---|
| 2015/0304918 A1* | 10/2015 | Jung | H04W 48/20 455/436 |
| 2016/0302230 A1 | 10/2016 | Novlan et al. | |
| 2017/0311316 A1* | 10/2017 | Chendamarai Kannan | H04W 48/16 |
| 2018/0098258 A1* | 4/2018 | Annam | H04W 24/10 |
| 2019/0053082 A1* | 2/2019 | Alriksson | H04W 76/19 |
| 2019/0289535 A1* | 9/2019 | Lu | H04W 24/10 |

FOREIGN PATENT DOCUMENTS

| | | |
|---|---|---|
| KR | 20170066380 | 6/2017 |
| WO | WO2016068653 | 5/2016 |
| WO | WO2016144002 | 9/2016 |
| WO | WO2017/026984 | 2/2017 |

* cited by examiner

*Primary Examiner* — Michael Thier
*Assistant Examiner* — Prince A Mensah
(74) *Attorney, Agent, or Firm* — Fish & Richardson P.C.

(57) ABSTRACT

A method for managing a radio link in an unlicensed band is provided. An apparatus attempts to receive a discovery reference signal (DRS) in a serving cell that is operated in the unlicensed band. The apparatus determines that a radio link to the serving cell has failed if the DRS is not received for a predetermined time.

13 Claims, 5 Drawing Sheets

METHOD AND APPARATUS FOR MANAGING RADIO LINK IN UNLICENSED BAND

CROSS-REFERENCE TO RELATED APPLICATIONS

This application is a National Stage application under 35 U.S.C. § 371 of International Application No. PCT/KR2018/009321, filed on Aug. 14, 2018, which claims the benefit of U.S. Provisional Applications No. 62/546,026 filed on Aug. 16, 2017, No. 62/564,274 filed on Sep. 28, 2017, No. 62/626,599 filed on Feb. 5, 2018 and No. 62/628,286 filed on Feb. 9, 2018. The disclosures of the prior applications are incorporated by reference in their entirety.

BACKGROUND

Field

The present disclosure relates to wireless communication, and more particularly, to a method of managing a radio link in a wireless communication system, and an apparatus using the method.

Related Art

In 3rd generation partnership project (3GPP), there was an agreement on an overall schedule and concept for 5G standardization in a workshop held in September 2015. An enhanced mobile broadband (eMBB), massive machine type communication (MTC), ultra-reliable and low latency communication (URLLC), or the like was specified as a top-level use-case. In order to satisfy a service scenario and a new requirement, in the 3GPP, it was determined to define a new radio (NR) different from the existing long term evolution (LTE), and both the LTE and the NR were defined as a 5G radio access technique.

Radio resource measurement (RRM) and radio link monitoring (RLM) are used to select a cell to be accessed by a wireless device or to maintain a connection with the cell being accessed. The wireless device persistently monitors reception quality of the cell being accessed, and attempts an access to a new cell when the reception quality deteriorates.

An unlicensed band is a band in which various communication protocols co-exist. Since various interference factors have to be considered, communication reliability may decrease when only reception quality is used to determine whether to maintain the connection with the cell.

SUMMARY

The present disclosure provides a method for managing a radio link in an unlicensed band and a device using the same.

In an aspect, a method for managing a radio link in an unlicensed band is provided. The method includes attempting to receive a discovery reference signal (DRS) in a serving cell operating in the unlicensed band, and determining that a radio link with the serving cell has failed if the DRS is not received for a specific time.

The DRS may include a downlink (DL) signal for maintaining synchronization with the serving cell.

In another aspect, a device for managing a radio link in an unlicensed band includes a transceiver configured to transmit and receive a radio signal, and a processor operatively coupled with the transceiver. The processor is configured to attempt to receive a discovery reference signal (DRS) in a serving cell operating in the unlicensed band via the transceiver, and determine that a radio link with the serving cell fails if the DRS is not received for a specific time.

Communication reliability with a cell can be improved by more accurately determining quality of a radio link in an unlicensed band in which various communication protocols co-exist.

DESCRIPTION OF EXEMPLARY EMBODIMENTS

Technical features described hereinafter may be applied in a communication specification by the 3rd Generation Partnership Project (3GPP) standardization organization or a communication specification by the Institute of Electrical and Electronics Engineers (IEEE) standardization organization. For example, the communication specification by the 3GPP standardization organization includes a Long Term Evolution (LTE) and/or an evolution of the LTE system. The evolution of the LTE system includes LTE-A (Advanced), LTE-A Pro, and/or 5G New Radio (NR). The communication specification by the IEEE standardization organization includes a wireless local area network system such as IEEE 802.11a/b/g/b/ac/ax. The above-described system uses various multiple access technologies such as Orthogonal Frequency Division Multiple Access (OFDMA) and/or Single Carrier-Frequency Division Multiple Access (SC-FDMA) for an uplink and/or a downlink. For example, only OFDMA may be used for a downlink, only SC-FDMA may be used for an uplink, and OFDMA and SC-FDMA may be used with mixed for a downlink and/or an uplink.

A wireless device may be fixed or mobile, and may be referred to as other terms such as a user equipment (UE), a mobile station (MS), a mobile terminal (MT), a user terminal (UT), a subscriber station (SS), a personal digital assistant (PDA), a wireless modem, a handheld device, etc. The wireless device may also be a device that supports only data communication such as a Machine-Type Communication (MTC) device.

A base station (BS) generally refers to as a fixed station that communicates with the wireless device and may be referred to as other terms such as an evolved-NodeB (eNB), a gNB, a base transceiver system (BTS), an access point, etc. A Transmission Reception Point (TRP) includes an antenna array having one or more antenna elements. The BS may include one or more TRPs.

New radio (NR), which is 5G radio access technology supports various bandwidths and frequency bands for more flexible scheduling. NR also supports frequency bands of 6 GHz or above as well as frequency bands of 6 GHz or below. Supported bandwidths are maximum 100 MHz at frequencies of 6 GHz or below and maximum 400 MHz at frequencies of 6 GHz or above. Further, unlike 3GPP LTE fixed to subcarrier spacing of 15 kHz, NR may support various subcarrier spacing of 15 kHz, 30 kHz, 60 kHz, 120 kHz, and 240 kHz.

An NR specification supports various numerologies. A structure of a radio frame is changed according to numerology. Table 1 represents an example of supported numerology.

TABLE 1

| Numerology index ($\mu$) | Subcarrier spacing (kHz) | Cyclic prefix | Number of OFDM symbols per slot | Number of slots per radio frame | Number of slots per subframe |
| --- | --- | --- | --- | --- | --- |
| 0 | 15 | Normal | 14 | 10 | 1 |
| 1 | 30 | Normal | 14 | 20 | 2 |
| 2 | 60 | Normal | 14 | 40 | 4 |
| 2 | 60 | Extended | 12 | 40 | 4 |
| 3 | 120 | Normal | 14 | 80 | 8 |
| 4 | 250 | Normal | 14 | 160 | 16 |

Figure 1:
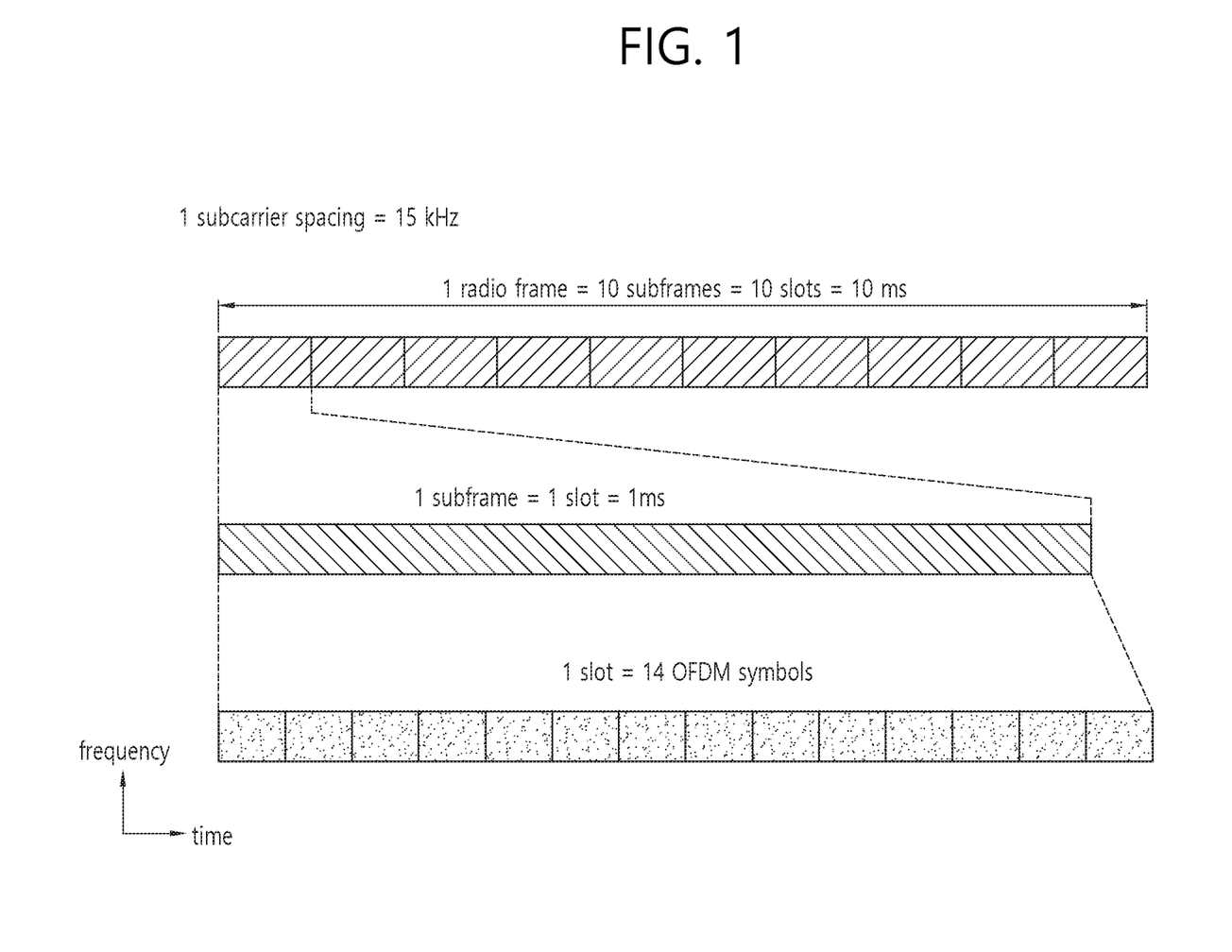
FIG. 1 shows an example of a radio frame structure to which the present disclosure is applied.

FIG. 1 illustrates an example of a radio frame structure to which the present disclosure is applied. This illustrates an example with a numerology index $\mu=0$ of Table 1.

A slot may include a plurality of orthogonal frequency division multiplexing (OFDM) symbols. The number of OFDM symbols in slots of Table 1 is only an example. The OFDM symbol is only for representing one symbol period in a time domain and does not limit a multiple access scheme or a term. For example, the OFDM symbol may be referred to as another term such as a single carrier-frequency division multiple access (SC-FDMA) symbol, a symbol period, etc.

OFDM symbols in the slot may be classified into a downlink (DL), flexible, and an uplink (UL). The classification is referred to as a slot format. A base station may notify a wireless device of information about the slot format. The wireless device may receive information on the slot format through an upper layer signal and/or downlink control information (DCI) on a Physical Downlink Control Channel (PDCCH). The wireless device assumes that DL transmission occurs in a DL OFDM symbol or a flexible OFDM symbol. The wireless device performs UL transmission in a UL OFDM symbol or a flexible OFDM symbol.

A resource block (RB) includes a plurality of continuous subcarriers in a frequency domain. For example, the RB may include 12 subcarriers. The common RB (CRB) is an RB in which an index is determined according to numerology. A Physical RB (PRB) is an RB defined in a bandwidth part (BWP). It is assumed that a total bandwidth of a particular numerology is 20 RB. The CRB is indexed from 0 to 19. When the BWP includes four CRBs (CRB 4 to CRB 7) among the 20 RBs, the PRB in the BWP are indexed from 0 to 3.

The BWP may be defined through a starting offset and a size from a CRB 0 on a given carrier. A specific number (e.g., maximum four) of BWP may be configured to the wireless device. At a particular time point, only a particular number (e.g., one) of BWPs per cell may be activated. The number of configurable BWPs or the number of activated BWPs may be set in common to an UL and a DL or individually set. The wireless device may expect DL transmission only in the activated DL BWP. The wireless device may perform UL transmission only in the activated UL BWP.

The wireless device may perform cell search to obtain time and/or frequency synchronization with the cell and to obtain a cell ID. For cell search, synchronization channels such as a Primary Synchronization Signal (PSS), a Secondary Synchronization Signal (SSS), and a Physical Broadcast CHannel (PBCH) may be used.

Figure 2:
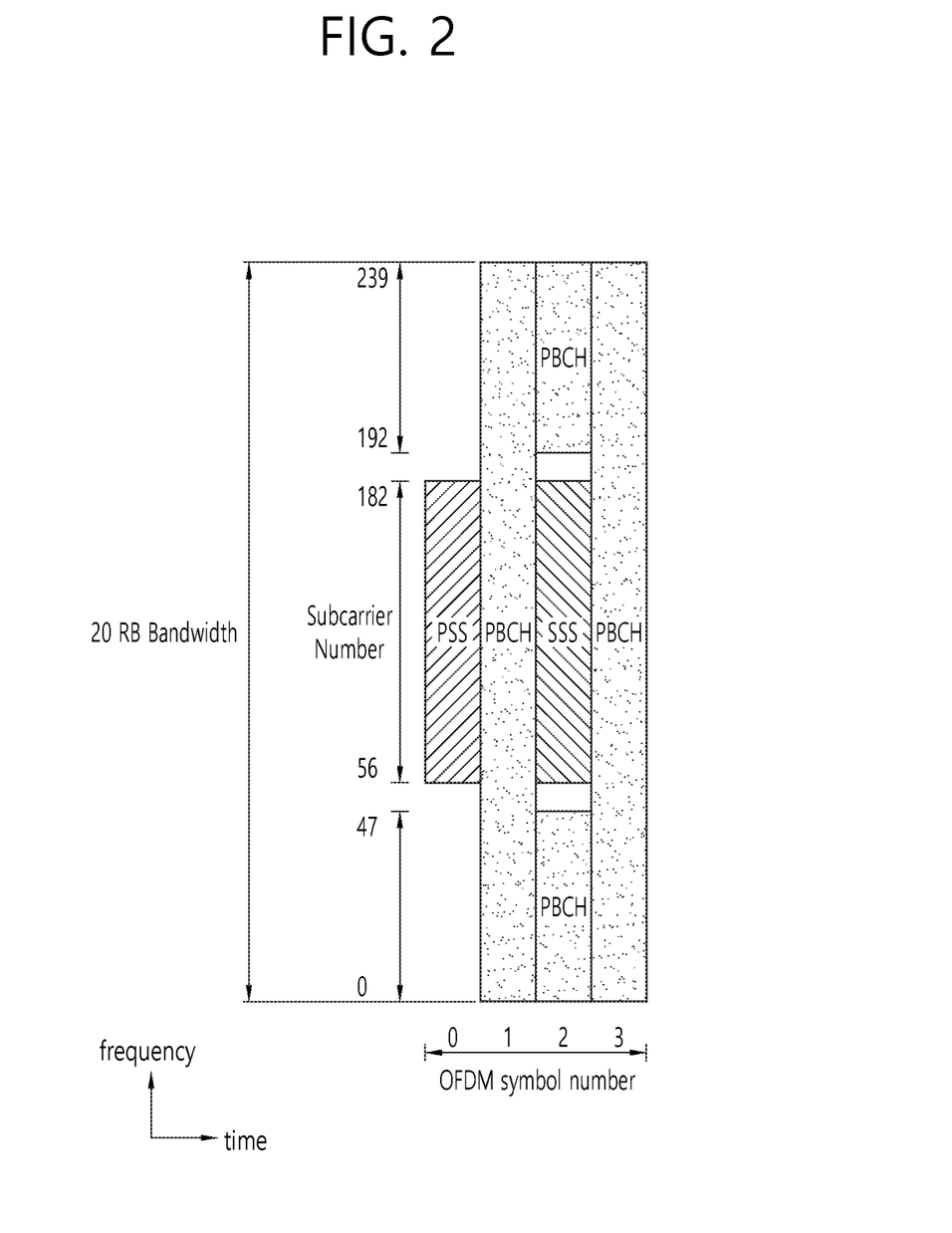
FIG. 2 shows an example of a synchronization channel applied to an example of the present disclosure.

FIG. 2 illustrates an example of a synchronization channel applied to an example of the present disclosure. The PSS and the SSS each may be transmitted through 127 subcarriers in one OFDM symbol. The PBCH may be transmitted through 240 subcarriers in 3 OFDM symbols.

A Synchronization Signal/PBCH (SSB) block includes a time/frequency resource in which the PSS, the SSS and the PBCH are to be transmitted. The PSS is used for obtaining symbol timing of the SSB block, and indicates three hypotheses for cell ID identification. The SSS is used for identifying a cell ID and indicates 336 hypotheses. As a result, 1008 physical layer cell IDs may be identified based on the PSS and the SSS.

The SSB block may be repeatedly transmitted according to a predetermined pattern within an SSB window. The SSB window may have a length of 5 ms. For example, when L SSB blocks are transmitted during one SSB window, all of L SSB blocks carries the same information but may be transmitted through beams with different directions. Quasi co-location (QCB) may not be applied to SSB blocks within one SSB window. A beam used for receiving the SSB block may also be used in subsequent operations (e.g., random access operations) between the wireless device and the network. The SSB window may be repeated at a specific period (e.g., 20 ms). The repetition period may be determined individually according to numerology.

The PBCH has a bandwidth of 20 RBs in second and fourth OFDM symbols, and a bandwidth of 8 RBs in a third OFDM symbol. A demodulation reference signal (DMRS) for decoding the PBCH is included in the PBCH. A frequency resource of the DMRS is determined based on a cell ID. The DMRS for the PBCH may include information indicating an index of an SSB block.

The PBCH may carry a Master Information Block (MIB). System information (SI) may be classified into Minimum SI (MSI) and Other SI (OSI). The MSI may be further classified into MIB and System Information Type1 (SIB1). The remaining MSI except for the MIB may be referred to as Remaining Minimum SI (RMSI).

The MIB includes information necessary for decoding the SIB1. For example, the MIB may include at least one of a message for SIB1 and a random access procedure, a subcarrier spacing applied to other system information, a frequency offset between an SSB block and an RB transmitted after the SSB block, a bandwidth of the PDCCH/SIB, and information for encoding the PDCCH. The MIB may be periodically transmitted, and the same MIB may be repeatedly transmitted during a specific time interval. The SIB1 is repeatedly transmitted through the PDSCH and includes control information for initial access of the UE and information for decoding another SIB.

The DL channel includes a Physical Downlink Control Channel (PDCCH), a Physical Downlink Shared Channel (PDSCH) and a Physical Broadcast Channel (PBCH). The UL channel includes a Physical Uplink Control Channel (PUCCH), a Physical Uplink Shared Channel (PUSCH) and a Physical Random Access Channel (PRACH).

The PDSCH carries DL data. The PBCH carries a Master Information Block (MIB) necessary for initial access. The PUSCH carries UL data.

The PDCCH carries DCI. The DCI includes a UL grant having resource allocation that schedules PUSCH transmission or a DL grant having resource allocation that schedules PDSCH transmission. A control resource set (CORESET) is defined as a resource for monitoring the PDCCH. A unique identifier is masked to cyclic redundancy check (CRC) of the DCI so that the wireless device may identify an owner or content of DCI in the PDCCH. The identifier is referred to as a Radio Network Temporary Identifier (RNTI). When the DCI includes UL grant or DL grant for a particular wireless device, Cell-RNTI (C-RNTI) is used. When the DCI carries system information, system information-RNTI (SI-RNTI) is used.

The PUCCH carries uplink control information (UCI). The UCI may include hybrid automatic repeat request (HARD) ACK/NACK and/or channel state information (CSI). The PUCCH may be transmitted in one or more OFDM symbols according to a PUCCH format.

A plurality of serving cells may be configured to a wireless device. Each serving cell may correspond to a BWP or a carrier. A serving cell may be classified into a primary cell and a secondary cell. The primary cell is a cell in which the wireless device may perform initial connection establishment or connection re-establishment. The secondary cell may be activated or de-activated by an instruction of the primary cell.

The following embodiments may be operated in a licensed band or an unlicensed band. The licensed band is a band that guarantees exclusive use of a particular communication protocol or a particular service provider. The unlicensed band is a band in which various communication protocols co-exist and that guarantees shared use. For example, the unlicensed band may include 2.4 GHz band and/or 5 GHz band used by a wireless local area network (WLAN). In the unlicensed band, it is assumed that a channel is occupied through contention between respective communication nodes. Therefore, in communication in the unlicensed band, it is required to confirm that signal transmission is not achieved by other communication nodes by performing channel sensing. This is referred to as listen before talk (LBT) or clear channel assessment (CCA) for convenience. When it is determined that the other communication node does not transmit any signal in a particular channel, it is referred to that 'a channel is idle', 'CCA was confirmed', 'or LBT was confirmed'. When it is said that 'Perform LBT', 'Perform CCA', or 'Perform carrier sense (CS)', it implies that whether a channel is idle or is used by another node is confirmed first and thereafter the channel is accessed. A cell operating in the unlicensed band is referred to as an unlicensed cell or Licensed-Assisted Access (LAA) cell. A cell operating in the licensed band is referred to as a licensed cell.

Radio resource measurement (RRM) and radio link monitoring (RLM) are used to select a cell to be accessed by a wireless device. The wireless device may measure DL reception quality and report it periodically or aperiodically to a BS. The DL reception quality may be measured through a reference signal or all reception signals. The reference signal used by the wireless device in CSI measurement is called CSI-RS.

To evaluate reception quality of a cell, the wireless device may measure the following measurement values.

RSR P (reference signal received power): Power measurement value of reference signal received by wireless device RSRQ (reference signal received quality): Ratio of reference signal power against total power received by wireless device RSSI (received signal strength indicator): Total power received by wireless device. RSSI implies total power received with respect to specific band for specific time duration irrespective of specific signal or noise.

Figure 3:
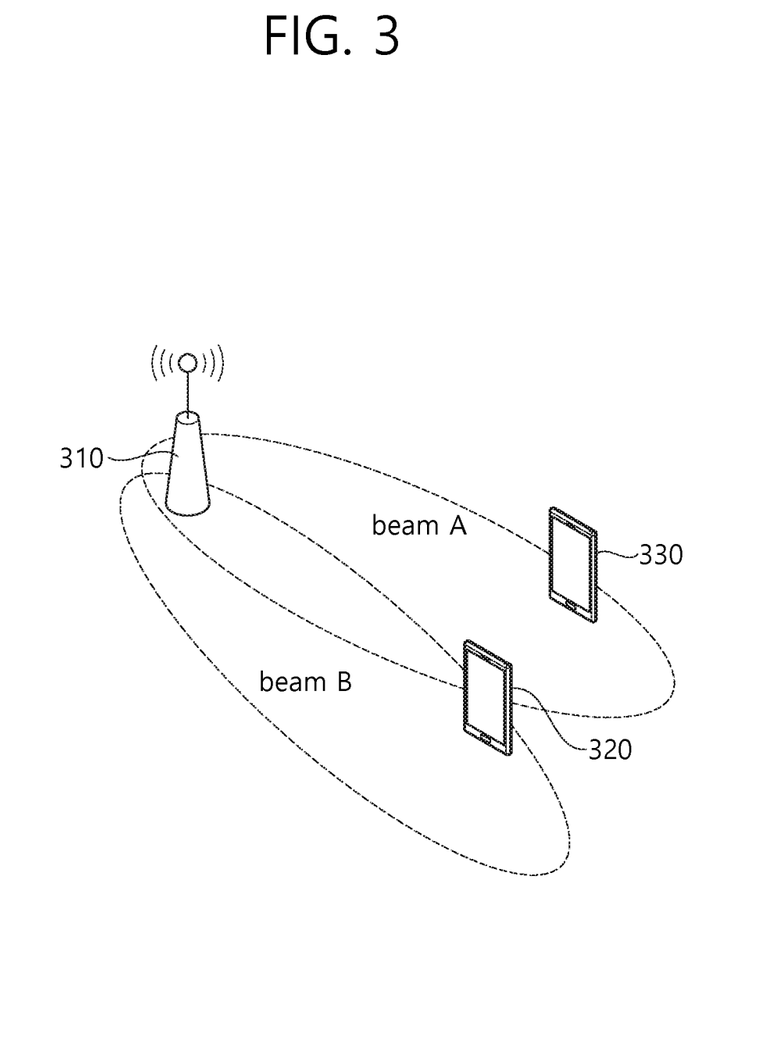
FIG. 3 shows an example of a system to which an embodiment of the present disclosure is applied.

FIG. 3 shows an example of a system to which an embodiment of the present disclosure is applied.

ABS 310 operates an unlicensed cell. A wireless device 320 may report information on RSSI with respect to any time duration to provide an interference situation at an unlicensed band.

The BS 310 may perform DL transmission through different DL beams for a transmission duration (e.g., slot or OFDM symbol). In particular, a signal for DL synchronization (SSB block or channel state information-reference signal (CSI-RS)) may be transmitted through different beams for a specific duration.

DL interference experienced by the wireless device 320 in the unlicensed band may vary depending on a DL beam used by the BS 310. When neighboring devices use LBT to determine whether to transmit a signal, an LBT result may vary depending on the DL beam used by the BS. For example, UL transmission of a neighboring wireless device 330 may act as interference to a DL signal transmitted by the BS 310 to the wireless device 320. When the BS 310 transmits the DL signal to the wireless device 320 by using a beam A out of the beams A and B, the neighboring wireless device 330 detects the DL signal through an LBT operation and does not transmit a UL signal.

From a perspective of the wireless device 320, an RSSI value indicated in the DL signal using the beam A is smaller than an RSSI value indicated in the DL signal using the beam B. Therefore, if RSSI based on a DL beam is provided to the BS, it may be useful for the BS to determine a DL beam suitable for a specific wireless device.

The following scheme is proposed to report the RSSI.

In an embodiment, a wireless device may measure and report the RSSI for each beam transmitted by a BS accessed by the wireless device or by a neighboring BS. When it is said that 'RSSI is measured for each beam', it may imply that the RSSI is measured in a duration in which DL signals (SSB block and/or CSI-RS) that can be transmitted with different beams are transmitted or the RSSI is measured for each duration in which DL transmission bursts are transmitted by using different transmit (TX) beams. The DL transmission burst may include information on a TX beam type.

The wireless device may measure and report the RSSI for each duration in which a CSI-RS or SSB block determined by the BS is transmitted. If the BS provides information on a beam duration in which each beam is used, the wireless device may measure the RSSI for each beam duration. The wireless device may report to a network an average of RSSI values measured in a beam duration in which the same beam is transmitted.

The wireless device may also experience a different interference situation according to a receive (RX) beam applied to DL reception. The wireless device may measure the RSSI for each RX beam applied by the wireless device and report it to the BS. The wireless device may measure the RSSI without distinction of a duration in which a DL signal is transmitted to the BS or a duration in which the DL signal is not transmitted. When the RX beam of the wireless device is associated with a TX beam of the BS, the RSSI may be measured only for a duration in which the TX beam is transmitted. When the RSSI is measured for each TX beam, the wireless device may report one RSSI for a plurality of RX beams associated with one TX beam. Alternatively, the wireless device may report respective RSSIs for the plurality of RX beams associated with one TX beam, so that the BS can select an RX beam for which the RSSI is optimized.

Now, a criterion for RLM and cell (re)selection will be described.

RLM means that a wireless device persistently monitors DL quality by using a reference signal or the like. If the DL quality deteriorates, the wireless device performs cell reselection which disconnects a current cell and attempts an access to another cell. The wireless device which attempts an initial access searches for neighboring cells, and performs cell selection for selecting a cell to be accessed by measuring the DL quality.

The DL quality may vary for each cell. In a cell (re)selection process, the wireless device uses RSRP as DL quality for cells belonging to the same band, and uses RSRQ as DL quality for cells belonging to different bands. However, in an unlicensed band, the RSRP or the RSRQ may not represent correct DL quality. In the unlicensed band, potential interference nodes around the wireless device may use LBT to stop transmission. Therefore, how much interference for the wireless device is decreased in amount may be an important criterion used by the wireless device to select a cell.

The following embodiment may be applied not only to cell (re)selection but also a beam recovery process. In a situation of using multiple beams, the wireless device may perform a beam recovery operation if a communication state for a specific beam is not good. The beam recovery operation is a process in which the wireless device reports that there is a problem in reception of a specific beam, or further, selects a better beam through cell negotiation. The beam recovery operation may imply an operation in which the wireless device transmits a specific UL signal (e.g., a random access preamble) to a BS to trigger an operation of searching for a new beam.

In an unlicensed band, the wireless device may perform cell (re)selection on the basis of RSRQ even if cells belong to the same band. RSSI used to calculate the RSRQ may be measured only for a duration in which a specific DL signal (SSB block and/or CSI-RS) is transmitted.

Whether LBT is successful in the unlicensed band varies depending on an interference environment around the wireless device. Therefore, it may be ineffective to determine whether to maintain a connection with a cell only through RSRP/RSRQ measurement. For example, if an unlicensed cell persistently fails in DL transmission due to a failure in LBT, even if quality of a DL signal is good, it may be disadvantageous to maintain the connection with the unlicensed cell even if quality of the DL signal is good.

Accordingly, if a discovery reference signal (DRS) is not detected more than a specific time from a cell being accessed, the wireless device may declare a radio link (RL) failure for the cell and perform cell reselection. Likewise, if the DRS is not detected more than a specific time from the cell being accessed, the wireless device may perform beam recovery.

The DRS may include a signal required to maintain synchronization with a cell and/or a signal used to measure DL quality. The DRS may include an SSB block and/or CSI-RS. If reception quality of the DRS is higher than a DRS threshold, it may be said that reception quality higher than a specific level is satisfied. The DRS threshold may be lower than a threshold used to determine the RL failure.

If the DRS is not detected more than N times (N is an integer satisfying N>=0) for a specific time, it may be determined as a DRS detection failure. If the DRS is detected less than M times (M is an integer satisfying M>=1) for a specific time, it may be determined as a DRS detection failure. Alternatively, if the DRS is not detected more than n % of DRS occasion for a specific time, it may be determined as a DRS detection failure. If the DRS is detected less than m % for a specific time, it may be determined as a DRS detection failure. The DRS opportunity refers to a time window in which the wireless performs monitoring to detect the DRS.

As the wireless device fails to detect the DRS, the BS may inform the wireless device of an RL failure or a condition for initiating beam coverage. The condition may include at least any one of a DRS detection period, a DRS detection count, and a DRS threshold. The BS may broadcast information on whether LBT for DRS transmission is successful or fails. The wireless device may perform cell (re)selection on the basis of this information. For example, the wireless device may preferentially select a cell in which the number of times of failing in LBT for the DRS is small.

Figure 4:
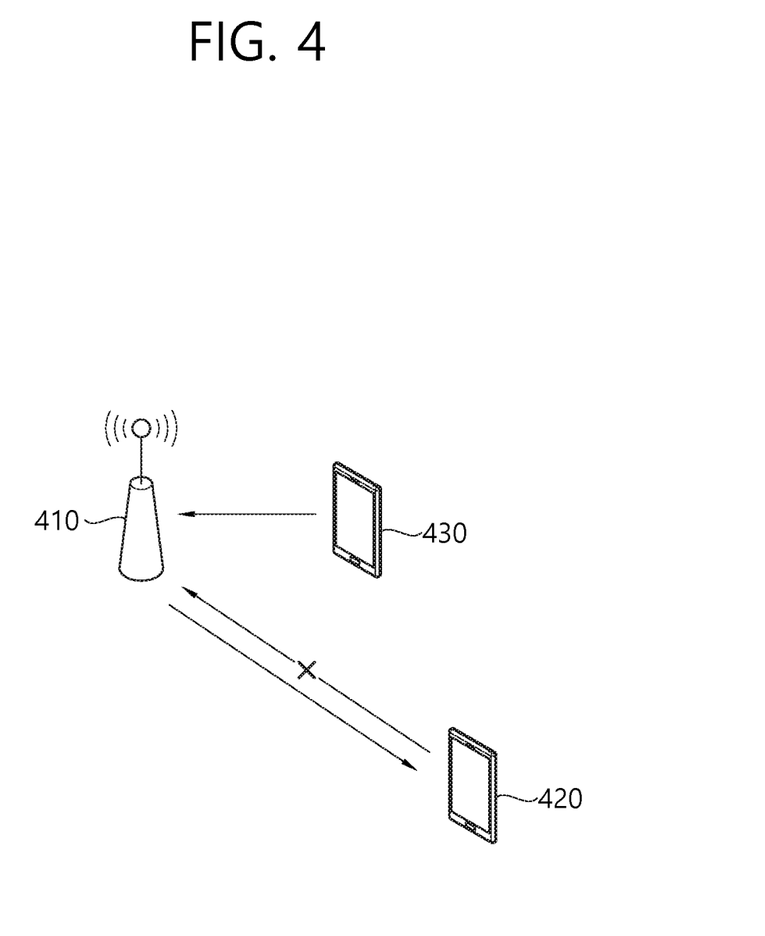
FIG. 4 shows another example of a system to which an embodiment of the present disclosure is applied.

FIG. 4 shows another example of a system to which an embodiment of the present disclosure is applied.

In an unlicensed band, an interference environment for DL reception of a wireless device may be different from an interference environment for UL reception of a cell. Even if DL reception quality is good, it may be difficult to maintain smooth communication if the cell does not receive UL transmission of the wireless device. A DL signal transmitted by a cell 410 to a first wireless device 420 is received without interference. A UL signal transmitted by the first wireless device 420 to the cell 410 may be significantly interfered by a signal of a second wireless device 430. Therefore, in order to select a cell to be accessed in an unlicensed band or to maintain a connection with the cell, not only a DL communication environment but also a UL communication environment may be an important criterion.

It is a cell that can directly measure the UL interference environment. However, if the interference environment changes abruptly, the cell may allow the wireless device not to instruct a cell change. Therefore, it may be advantageous for the wireless device to determine whether to autonomously maintain a connection with the cell according to the UL interference environment.

In an embodiment, HARQ-ACK received by the wireless device may be utilized as a criterion by which the wireless device determines the UL interference environment. Upon successfully receiving UL data from the wireless device, the cell sends the HARQ-ACK. Upon failing in reception of UL data, the cell sends the HARQ-NACK and/or resource allocation for retransmission. If the HARQ-ACK or a UL grant for scheduling new UL transmission is not received for a specific time, the wireless device may declare an RL failure and perform cell reselection. Alternatively, if the reception failure is repeated K times (K is an integer satisfying K>=1) for a specific time, the RL failure may be declared and cell reselection may be performed. Likewise, if the HARQ-ACK or the UL grant for scheduling new UL transmission is not received for a specific time in a specific beam of a cell being accessed, the wireless device may perform beam recovery.

In another embodiment, the wireless device may utilize whether LBT for UL transmission is successful or fails on the basis of a criterion for determining the UL interference environment. The wireless device performs the LBT before UL transmission is performed in an unlicensed band. Upon failing in the LBT for a specific time, the wireless device may declare an RL failure and perform cell reselection. Upon failing in the LBT repeatedly K times for a specific time, the RL failure may be declared and the cell reselection may be performed. Upon failing in the LBT during a specific time in a specific beam of a cell being accessed, the wireless device may perform beam recovery.

The aforementioned embodiment may be applied to a random access process (random access preamble, random access response, etc.) performed by a wireless device and a BS.

When the wireless device can operate both in an unlicensed band and a licensed band, cell (re)selection may be performed between an unlicensed cell and a licensed cell. In this case, the following schemes are proposed.

In an embodiment, the licensed cell has a higher priority than the unlicensed cell. This is because a communication environment of the licensed cell is more stable than a communication environment of the unlicensed cell. A reception quality measurement value of the licensed cell may be weighted such that a reception quality measurement value of the unlicensed cell is adjusted to be lower. Alternatively, a probability of accessing the licensed cell may be set to be higher than a probability of accessing the unlicensed cell.

In another embodiment, the BS may set an access priority of the licensed cell and unlicensed cell. The BS may transmit information on the access priority of the licensed cell and unlicensed cell through an RRC message or the like, so that the cell can be selected according to a business need of a communication operator. The priority information may be transmitted through a broadcast channel. The priority information may include a weight of the reception quality measurement value of the unlicensed cell and/or a weight of the reception quality measurement value of the licensed cell. The priority information may include information on the probability of accessing the licensed cell and/or the probability of accessing the unlicensed cell.

In another embodiment, a threshold for a DL reception quality measurement value for accessing the unlicensed cell may be set to be lower than a threshold for DL reception quality for accessing the licensed cell. This is because the DL reception quality in the unlicensed cell may be generally lower than DL reception quality in the licensed cell due to an interference signal from various nodes.

In another embodiment, a threshold applied to a quality measurement value of a signal received through the specific beam may be set to be lower than a threshold for the licensed cell, in order to determine whether to perform a beam recovery operation for the specific beam of the unlicensed cell.

Now, a CSI measurement and report in an unlicensed band will be described.

If LBT is successful in the unlicensed band, a BS transmits DL data in one or more slots. This is called a TX burst. CSI-RS may be transmitted in the TX burst, and TX power of the CSI-RS may vary for each TX burst. A wireless device may need to distinguish the CSI-RSs transmitted through different TX bursts to measure CSI on a TX burst basis. In addition, since a beam used by the CSI-RS may vary also in the TX burst, there is a need to distinguish beams. The wireless device may obtain an average value by combining CSI measurement values for the CSI-RS transmitted in the same TX burst or the same beam.

Schemes of distinguishing DL TX bursts and beams for CSI measurement are proposed.

(Scheme 1) The TX burst may be distinguished by using a preamble or a postamble. A BS may transmit the preamble before starting transmission of the TX burst. Alternatively, the BS may transmit the postamble after completing transmission of the TX burst. The preamble and the postamble may be predefined.

Upon detecting the preamble/postamble, a wireless device may assume that CSI-RS belongs to the same TX burst until a new preamble/postamble is detected again. Alternatively, the wireless device may assume that the same TX burst is transmitted until the new preamble/postamble is detected again.

Upon detecting the preamble/postamble, the wireless device may assume that CSI-RS received within a specific duration belongs to the same TX burst. Alternatively, the wireless device may assume that the same TX burst is transmitted during the specific duration.

Upon detecting the preamble, the wireless device may assume that the CSI-RS belongs to the same TX burst until the new postamble is detected again. Alternatively, the wireless device may assume that the same TX burst is transmitted until the new postamble is detected again.

(Scheme 2) The TX burst may be distinguished by using demodulation reference signal (DM-RS). A BS may transmit the DM-RS for data demodulation for each slot. When the DM-RS is transmitted through up to J OFDM symbols in one slot, a wireless device may assume that, after a slot in which the DM-RS is first detected, all consecutive slots in which DM-RS is detected belong to the same TX burst. Alternatively, a sequence or resource mapping for the DM-RS may vary depending on the TX burst.

(Scheme 3) The TX burst may be distinguished by using CSI-RS. A sequence or resource mapping for the CSI-RS may vary depending on the TX burst. A wireless device may assume that a slot in which the same CS-RS sequence is detected is the same TX burst.

(Scheme 4) DCI may include information on the TX burst. DCI for scheduling the TX burst may include an identifier of the TX burst and information on a length of the TX burst. The DCI may be common DCI, and may be masked with CC-RNTI or GC-RNTI.

(Scheme 5) CSI measurement may be limited for each slot. A duration in which a wireless device can measure CSI may be limited as a duration in which CSI-RS is transmitted and/or a duration in which a different DL signal is detected. In this case, the wireless device does not have to distinguish the TX burst for CSI measurement.

The aforementioned schemes may also be applied to distinguish a TX beam for CSI measurement. As a first example, the TX beam may be distinguished by using a preamble/postamble. The TX beam may be distinguished according to a sequence and/or resource mapping used in the preamble/postamble. As a second example, the TX beam may be distinguished by using DM-RS. The TX beam may be distinguished according to a sequence and/or resource mapping used in the DM-RS. As a third example, the TX beam may be distinguished by using CSI-RS. The TX beam may be distinguished according to a sequence and/or resource mapping used in the CSI-RS. As a fourth example, DCI for scheduling the TX burst may include information related to the TX beam. The TX beam may be distinguished according to a time/frequency domain in which a scrambling sequence of the DCI, a CRC scrambling sequence, RNTI, and DCI are transmitted.

In an unlicensed band, a start point of DL transmission is determined according to whether LBT is successful. Even if CSI-RS is transmitted in an i-th slot, the CSI-RS is not transmitted if LBT is not successful before the i-th slot. The following method is proposed so that the CSI-RS can be transmitted at a desired time point. In an embodiment, a transmission start time point of CSI-RS may be set relative to a transmission start time point of the TX burst. The BS may inform the wireless device of the transmission time point of the CSI-RS as a time point relative to the transmission start time point of the TX burst. For example, assume that the CSI-RS is transmitted in a relative slot i (i is an integer satisfying i>=0). If the BS starts transmission of the TX burst in a slot X, it may be assumed that the CSI-RS is transmitted in a slot X+i.

The CSI-RS may be divided into non-zero-power (NZP) CSI-RS for S-measurement and zero-power (ZP) CSI-RS for I-measurement. A transmission time point of the ZP (or NZP) CSI-RS may be set relative to a transmission time point of the NZP (or ZP) CSI-RS. A transmission slot of the ZP CSI-RS may be determined as a slot position relative to a transmission slot of the NZP CSI-RS. For example, the ZP CSI-RS may be configured to be transmitted always only in a slot in which NZP CSI-RS is transmitted.

In the 3GPP LTE standard, DCI on a common PDCCH subjected to CRC-masking with CC-RNTI includes a subframe format or the like in a TX burst. In the 3GPP NR standard, DCI on a common PDCCH subjected to CRC-masking with GC-RNTI includes a slot format for one or more slots.

CSI-RS transmission based on semi-persistent scheduling (SPS) is also considered. A BS transfers a configuration for SPS CSI-RS transmission through an RRC message. The configuration may include information on a slot period, an absolute slot offset in the slot period, the number of CSI-RS ports in each slot, a position thereof, etc. In addition, the BS may instruct each wireless device to activate/deactivate SPS transmission through a PDCCH or a MAC message.

A CSI report based on SPS is also considered. The BS transfers a configuration for an SPS CSI-RS report through an RRC message. The configuration may include information on CSI-RS to be measured, a type of CSI report, a CSI report period, an absolute slot offset within the period, etc. The BS may instruct each wireless device to activate/deactivate an SPS report through a PDCCH or a MAC message.

In the unlicensed band, once the BS occupies a channel, it may be effective to perform DL transmission on a plurality of wireless devices by using the TX burst. Therefore, it may be more effective to trigger the CSI report to each wireless device than to trigger the CSI report to all wireless devices associated with the TX burst.

A common PDCCH transmitted through the TX burst may be used to provide information on CSI-RS transmitted in the TX burst. DCI on the common PDCCH transmitted through the TX burst may include information on whether CSI-RS is transmitted in the TX burst and/or a transmission type of CSI-RS. The common PDCCH may be masked with CC-RNTI or GC-RNTI. A transmission type of CSI-RS may include the number of ports of the CSI-RS, a frequency position of the CSI-RS, and a transmission period of the CSI-RS. Transmission information of the CSI-RS is not limited only in the TX burst, and thus may also be applied to a next TX burst with the meaning of activation/deactivation.

Information on CSI-RS transmitted in the TX burst may be given through the RRC message. A plurality of CSI-RS transmission types may be predetermined, and the common PDCCH may indicate which CSI-RS transmission type is used.

The BS may use the common PDCCH to indicate whether to report CSI by using CSI-RS transmitted in each TX burst. DCI on the common PDCCH transmitted through the TX burst may include information on whether the CSI-RS is transmitted in the TX burst, whether CSI is reported at a later time by using a UL burst, and/or a CSI report type. The common PDCCH may be masked with CC-RNTI or GC-RNTI. The CSI report type may include the number of ports of CSI-RS to be measured, a frequency position of CSI-RS, a transmission period of CSI report, a transmission offset of CSI report, etc. The CSI report is not limited only in the TX burst, and thus may also be applied to a next TX burst with the meaning of activation/deactivation.

A plurality of CSI report types may be given through the RRC message. The common PDCCH may indicate which CSI-RS report type is used.

Figure 5:
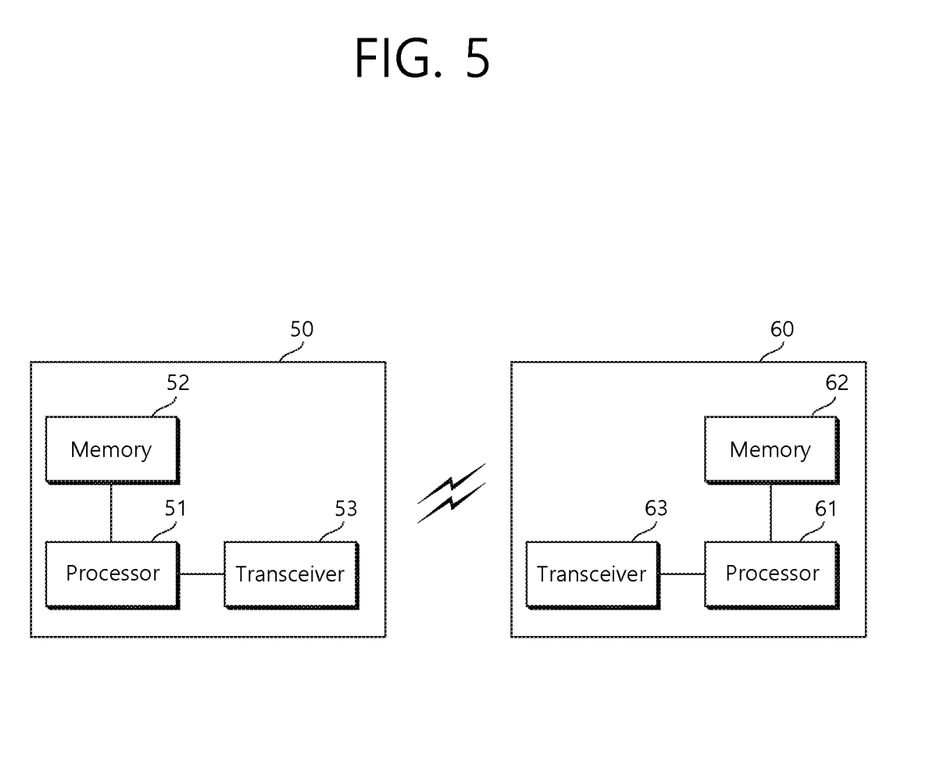
FIG. 5 is a block diagram showing a wireless communication system for which an embodiment of the present disclosure is implemented.

FIG. 5 is a block diagram showing a wireless communication system for which an embodiment of the present disclosure is implemented.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the wireless device may be implemented by the processor 51. When the aforementioned embodiment is implemented with a software instruction, the instruction may be stored in the memory 52, and may be executed by the processor 51 to perform the aforementioned operation.

ABS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:
1. A method for managing a radio link by a wireless device in an unlicensed band, the method comprising:
receiving information from a base station, wherein the information informs a time duration for receiving a discovery reference signal (DRS), a first number of

DRS receptions for determining radio link failure, and a second number of DRS receptions for determining beam recovery;

attempting to receive the DRS in a serving cell operating in the unlicensed band within the time duration;

declaring a radio link with the serving cell has failed based on the DRS not being received more than the first number within the time duration; and performing a beam recovery procedure based on the DRS not being received more than the second number within the time duration.

2. The method of claim 1, wherein the DRS includes a downlink (DL) signal for maintaining synchronization with the serving cell.

3. The method of claim 2, wherein the DRS includes at least one of a synchronization signal/physical broadcast channel (SSB) block and a channel state information-reference signal (CSI-RS).

4. The method of claim 1, wherein, if reception quality of the received DRS is lower than a reception threshold even if the DRS is received, it is regarded that the DRS is not received.

5. The method of claim 4, further comprising:

measuring DL reception quality of the serving cell; and determining that the radio link with the serving cell has failed if the DL reception quality is lower than a DL threshold.

6. The method of claim 5, wherein the reception threshold is less than the DL threshold.

7. The method of claim 1, further comprising:

performing cell reselection for selecting a new cell if it is determined that the radio link with the serving cell has failed.

8. A device for managing a radio link in an unlicensed band, the device comprising:

a transceiver configured to transmit and receive a radio signal; and a processor operatively coupled with the transceiver and configured to:

receive information from a base station, wherein the information informs a time duration for receiving a discovery reference signal (DRS), a first number of DRS receptions for determining radio link failure, and a second number of DRS receptions for determining beam recovery;

attempt to receive the DRS in a serving cell operating in the unlicensed band within the time duration;

declare a radio link with the serving cell has failed based on the DRS not being received more than the first number within the time duration; and perform a beam recovery procedure based on the DRS not being received more than the second number within the time duration.

9. The device of claim 8, wherein the DRS includes a downlink (DL) signal for maintaining synchronization with the serving cell.

10. The device of claim 9, wherein the DRS includes at least one of a synchronization signal/physical broadcast channel (SSB) block and a channel state information-reference signal (CSI-RS).

11. The device of claim 8, wherein, if reception quality of the received DRS is lower than a reception threshold even if the DRS is received, it is regarded that the DRS is not received.

12. The device of claim 11, wherein the processor is configured to:

measure DL reception quality of the serving cell; and determine that the radio link with the serving cell has failed if the DL reception quality is lower than a DL threshold.

13. The device of claim 12, wherein the reception threshold is less than the DL threshold.

* * * * *